US010827271B1

(12) United States Patent
Renna et al.

(10) Patent No.: US 10,827,271 B1
(45) Date of Patent: Nov. 3, 2020

(54) BACKWARD COMPATIBILITY FOR AUDIO SYSTEMS AND METHODS

(71) Applicant: SYNAPTICS INCORPORATED, San Jose, CA (US)

(72) Inventors: Stanton Renna, Irvine, CA (US); Paul Nguyen, Irvine, CA (US); Scott Lin, Taipei (TW); Leon Tu, Taipei (TW)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/595,369

(22) Filed: Oct. 7, 2019

(51) Int. Cl.
*H04R 5/04* (2006.01)
*H04R 5/033* (2006.01)
*H04L 29/06* (2006.01)

(52) U.S. Cl.
CPC ............ *H04R 5/04* (2013.01); *H04L 65/601* (2013.01); *H04L 65/608* (2013.01); *H04L 65/80* (2013.01); *H04R 5/033* (2013.01); *H04R 2420/09* (2013.01); *H04R 2499/11* (2013.01)

(58) Field of Classification Search
CPC .. H04R 5/04; H04R 2499/11; H04R 2420/09; H04L 65/601; H04L 65/608; H04L 65/80
See application file for complete search history.

(56) References Cited

U.S. PATENT DOCUMENTS

2018/0338210 A1* 11/2018 Weijand .............. H04R 29/001

OTHER PUBLICATIONS

"Universal Serial Bus Specification Revision 2.0", Apr. 27, 2000, 650 pages.

* cited by examiner

*Primary Examiner* — Kile O Blair
(74) *Attorney, Agent, or Firm* — Haynes and Boone, LLP

(57) ABSTRACT

A system includes a logic device configured to cause the system to perform operations. The operations include requesting, from a peripheral device coupled to a host device, a device descriptor of the peripheral device, receiving, from the peripheral device, the device descriptor including at least two configurations. A first configuration includes an audio communications protocol having a plurality of selectable audio bit-rates and a second configuration including a plurality of selectable audio bit-rates and burst-rates. The operations further include selecting, from the first configuration and the second configuration based, at least in part, on a configuration of the host device, wherein the host device is configured to select the second configuration when the host device is compatible with the second configuration and select the first configuration when the host device is not compatible with the second configuration.

20 Claims, 7 Drawing Sheets

Device Descriptor
VID=0x04e8
PID=0xa051b
NumConfigurations=2

Configuration 1
Interface 0
Audio Topology
Interface 1 (USB Record)
ALT 0 -> Stop
ALT 1 -> 16 bit 125us
ALT 2 -> 24 bit 125us
Interface 2 (USB Playback)
ALT 0 -> stop
ALT 1 -> 16 bit 125us
ALT 2 -> 24 bit 125us
ALT 3 -> 32 bit 125us
Interface 3
HID Configuration 2
Interface 0
Audio Topology
Interface 1 (USB Record)
ALT 0 -> Stop
ALT 1 -> 16 bit 125us
ALT 2 -> 24 bit 125us
ALT 3 -> 16 bit 8ms
ALT 4 -> 24 bit 8ms
Interface 2 (USB Playback)
ALT 0 -> stop
ALT 1 -> 16 bit 125us
ALT 2 -> 24 bit 125us
ALT 3 -> 32 bit 125us
ALT 4 -> 16 bit 8ms
ALT 5 -> 24 bit 8ms
ALT 6 -> 32 bit 8ms
Interface 3
HID

BACKWARD COMPATIBILITY FOR AUDIO SYSTEMS AND METHODS

TECHNICAL FIELD

The present application generally relates to backward compatibility between a host device and a peripheral device. More particularly, it is related to systems and methods for improving audio quality between legacy electronic devices and modern peripherals devices and modern electronic devices and legacy peripheral devices.

BACKGROUND

Many electronic devices use standard protocols, such as universal serial bus (USB), to connect with other devices. For example, smartphones may utilize a USB port to connect with peripheral devices such as audio headsets, computers, external cameras, etc. Modern standards, such as USB, specify power management techniques to reduce the consumption of power but sometimes, such power saving protocols are incompatible with legacy connection protocols and/or result in an unwanted drop in performance quality. As an example, a USB headset configured to maximize low power operation under a modern connection protocol (e.g., Link Power Management in the USB standard) may not function properly when connected to an older device. In some cases, these incompatibilities result in unwanted audio artefacts or other degradation of audio quality. Thus, systems and methods to provide backward compatibility for using older electronic devices with newer peripheral devices and/or using newer electronic devices with older peripheral devices is needed.

SUMMARY

According to an embodiment of the disclosure, a system is described including: a logic device configured to cause the system to perform operations including: requesting, from a peripheral device coupled to a host device, a device descriptor of the peripheral device; receiving, from the peripheral device, the device descriptor including at least two configurations, a first configuration including an audio communications protocol including a plurality of selectable audio bit-rates and a second configuration including a plurality of selectable audio bit-rates and burst-rates; and selecting, from the first configuration and the second configuration based, at least in part, on a configuration of the host device, wherein the host device is configured to select the second configuration when the host device is compatible with the second configuration and select the first configuration when the host device is not compatible with the second configuration.

According to another embodiment of the disclosure, an enumeration method by a host device is described. The method may include: requesting, from a peripheral device coupled to the host device, a device descriptor including at least two configurations, a first configuration including an audio communications protocol including a plurality of selectable audio bit-rates and a second configuration including a plurality of selectable audio bit-rates and burst-rates; receiving, from the peripheral device, the device descriptor comprising at the least two configurations; and selecting, from the first configuration and the second configuration based, at least in part, on a configuration of the host device, wherein the host device is configured to select the second configuration when the host device is compatible with the second configuration and select the first configuration when the host device is not compatible with the second configuration.

The scope of the invention is defined by the claims, which are incorporated into this section by reference. A more complete understanding of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
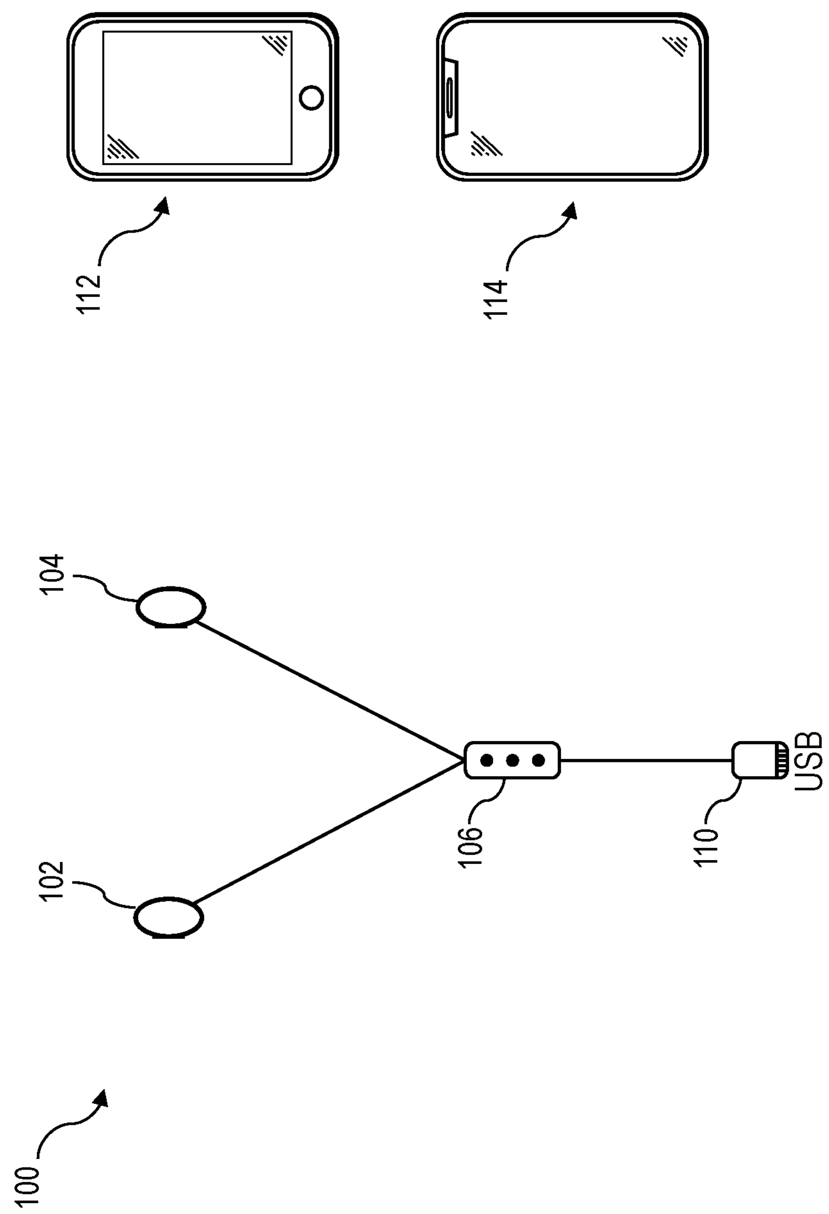
FIG. 1 is an illustration of an example system connectable by USB connections, according to an embodiment of the present disclosure.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Systems and methods for improving audio quality between connected legacy electronic devices and modern peripherals devices and modern electronic devices and legacy peripheral devices are disclosed.

The Universal Serial Bus (USB) specification sets standards for electronic host devices to connect with peripheral devices over a USB connection. One such example is connecting a set of digital headsets via a USB connection to a host device that can playback digital music such as a smartphone or an MP3 player. One feature of the USB standard specifies techniques for transmitting data over a USB bus in continuous bursts, for example, 125 us burst of data every 125 us. As such, the USB bus is busy and data is transmitted almost continuously, which is power consuming. By increasing the interval of these bursts, data can be transmitted less frequently and non-continuously. USB 2.0 standard specifies a method that can take advantage of the duration when the bus is idle (e.g., when data is not being transmitted on the bus) by putting the bus in an L1 sleep state through Link Power Management (LPM) techniques. Thus, as the burst interval is increased, the bus becomes idle for a longer period of time, and therefore the bus can be in the L1 state for a longer duration, which results in power savings for the host device. The 125 us burst of data may be transmitted, for example, every 125 us, 250 us, 500 us, 1 ms, 2 ms, 4 ms, 8 ms, or 16 ms.

When longer intervals are used between bursts, less power is consumed because the transmissions occur less frequently. One consequence of the longer intervals is that the user may experience a longer latency. In some applications the longer latency may be unnoticeable to the user. For example, if the host device is being used as a digital music player, effects from the longer latency may be hardly noticeable because the delay is experienced at the moment in which the music is turned on or off. Because there are no noticeable delays during music playback, the small consequence of latency may be acceptable in exchange for a longer battery life. On the other hand, if the host device is a smartphone and the peripheral device is being used as a headset for real-time communications, the longer latency between audio bursts may make it difficult for a user to have a phone conversation (e.g., because the latency may cause a delay every time the parties talk during a phone conversation). Modern computing systems and peripherals may be configured to address these performance and power consumption variations.

Some USB devices, such as USB headsets, may also include echo cancellation components (e.g., echo cancellation circuit, executable logic, etc.) to cancel and/or suppress audio generated from one or more speakers of the system that is picked up by a microphone of the USB device. Echo cancellation reduces unwanted interference and improves the user's ability to hear the desired audio (e.g., music or the other party talking) through the USB device. The echo cancellation components may include buffer and delay components to synchronize the audio signal generated by the system with the feedback signal sensed through a microphone to cancel the feedback signal. In some embodiments of the present disclosure, the host device is configured to detect an audio application that uses echo cancellation and select an audio configuration with latency that is compatible with the echo cancellation delay. By selecting a configuration with certain burst intervals (e.g., a 2-4 ms burst interval) the quality of the echo cancellation may be improved.

Some USB devices, such as active noise cancellation headsets, including active noise cancellation components including a microphone near the earpiece to pick up ambient noise which may be processed by the active noise cancellation components to remove (or otherwise lessen) the ambient noise in the user's ear canal. In some embodiments, the noise cancellation process may be performed through various digital signal processing techniques that may be implemented as part of the active noise cancellation components of the USB device.

Although power consumption can be reduced through power management techniques (e.g., LPM) to extend battery life, it often requires compatibility between the host device and peripheral device. For example, LPM is a desirable feature to implement but relies on both the host device and the peripheral device during operation. Problems may arise when a host device and a peripheral device from different generations (e.g., a modern device and a legacy device) are connected together. A relatively modern USB headset that is connected a legacy mobile device (e.g., an older generation smartphone) may create compatibility issues because the older device may not support certain features (e.g., LPM) that are supported by the newer device. For example, the legacy host device may not recognize or properly handle burst data that is transmitted at longer intervals. Even if the devices are functionally compatible, a small loss of audio quality may be noticeable to a user. On the other hand, if the same USB headset is connected to a newer smartphone (e.g., a newer generation Android smartphone), enumeration can take place and the smartphone may be able to handle high quality audio input and output through the USB headset while taking advantage of the LPM power management features.

In various embodiments disclosed herein, backwards compatibility between host devices and peripheral devices is provided so that legacy devices can operate with later generation devices. As used herein, the term "legacy" is intended to refer to a device that includes firmware, software, hardware, communications protocols and/or other technology that is outdated, relatively older than, different from and/or not compatible with another system or device, and the term "modern" is intended to refer to a device that includes firmware, software, hardware, communications protocols and/or other technology that is relatively newer, more advanced, and/or widely adopted compared to other older, legacy devices.

According to embodiments of the present disclosure, techniques will be described for providing backwards compatibility between host devices and peripheral devices. FIG. 1 is a system level diagram illustrating an example USB peripheral device as a USB headset 100 and example host devices as a legacy smartphone 112 and modern smartphone 114. The USB headset 100 may have earbuds or headset speakers 102, 104 for the left and right ears. In some embodiments, the headset 100 may also include a microphone 106 for conducting a phone conversation or recording an audio. The USB headset 100 has a USB plug 110 for connecting to a USB port of a USB host device such as the legacy smartphone 112 or modern smartphone 114. Various embodiments will be directed to techniques for providing backward compatibility of the USB headset 100 with the legacy smartphone 112 and the modern smartphone 114. By way of example and not of limitation, the legacy smartphone 112 may be an Android smartphone running on an older Android operating system, such as, for example Android 7.0 Nougat using an earlier USB protocol, and a modern smartphone 114 may be an Android smartphone running a new Android operating system, such as, for example, Android 8.0 Oreo using the latest USB protocol standard.

Figure 2:
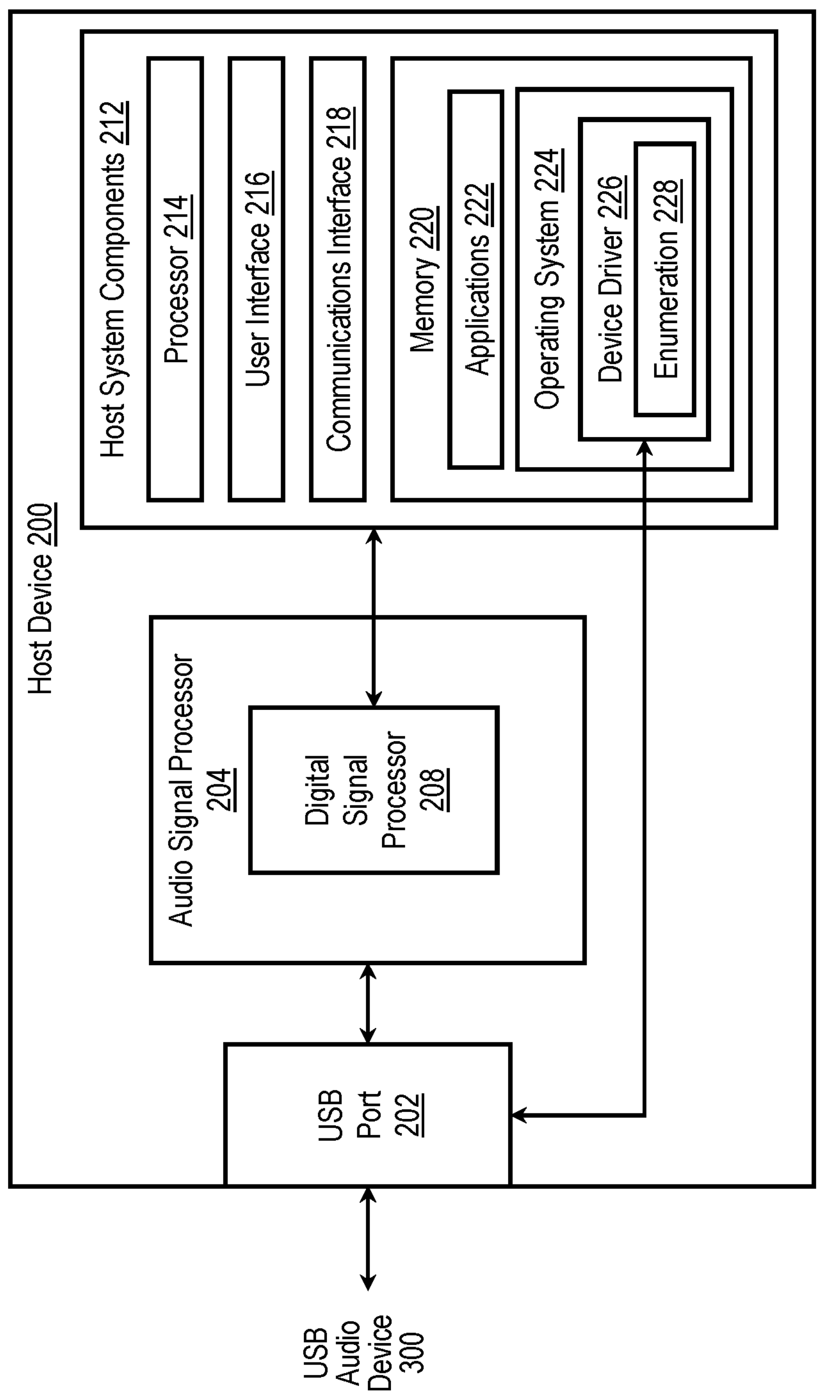
FIG. 2 is a block diagram of an example USB host device, according to an embodiment of the present disclosure.

FIG. 2 illustrates an example host device 200 according to various embodiments of the disclosure. The host device 200 includes an audio signal processor 204, host system components 212, and a USB port 202. The host device 200 may be coupled to a USB peripheral device, such as, for example, a USB headset 100, through a USB connection at the USB port 202.

The audio signal processor 204 is configured to facilitate audio input/output processing and perform other functions. In some embodiments, the audio signal processor 204 includes a digital signal processor 208 which may be implemented as an integrated circuit comprising digital and/or analog circuitry to process audio signals. The digital signal processor 208 may comprise one or more of a logic device, processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure.

The digital signal processor 208 is configured to process a digital audio input signal which is output to one or more host system components 212. In one embodiment, the digital signal processor 208 is configured to interface and communicate with the host system components 212, such as through a bus or other electronic communications interface. In various embodiments, an audio signal may include, for example, voice communications from another device or music or other audio that is being played back from memory, and the digital signal processor 208 is configured to process such audio signals for transmission to the connected peripheral devices. In some embodiments, an audio signal may be a human voice or other audio being provided from a microphone via the USB port 202, and the digital signal processor 208 is configured to process such audio signals to be received by the host system components 212.

The host device 200 may be implemented as a device with a USB port 202 configured to digitally process audio to playback and/or record the audio and transmit or receive through the USB port 202, such as, for example, a cellular smartphone or an MP3 player. The host system components 212 may comprise various hardware and software components for operating the audio processing device. In the illustrated embodiment, the host system components 212 include a processor 214, user interface components 216, a communications interface 218 for communicating with external devices and networks, such as a wireless or cellular network, and a memory 220 storing an operating system 224 and other applications 222.

The processor 214 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The host system components 212 are configured to interface and communicate with the audio signal processor 204 and the other system components 212, such as through a bus or other electronic communications interface.

It will be appreciated that although the audio signal processor 204 and the host system components 212 are shown as incorporating a combination of hardware components, circuitry and software, in some embodiments, at least some or all of the functionalities that the hardware components and circuitries are configured to perform may be implemented as software modules being executed by the processor 214 and/or the digital signal processor 208 in response to software instructions and/or configuration data, stored in the memory 220 or firmware of the digital signal processor 208.

The memory 220 may be implemented as one or more memory devices configured to store the operating system 224, applications 222, and other data and information such as audio data and program instructions. Memory 220 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of non-transitory memory.

The processor 214 may be configured to execute software instructions stored in the memory 220. The user interface components 216 may include a display, a touchpad display, a keypad, one or more buttons and/or other input/output components configured to enable a user to directly interact with the host device 200.

The applications 222 stored on the memory 220 may be software applications executable by the processor 214 to perform operations with or without user inputs from the user interface components 216. In some embodiments, an application 222 may be an audio player software for playing back music where a user may control the audio player application through the user interface components 216 by selecting music choices, starting and/or stopping the music, or adjusting the volume of the music playback. In other embodiments, the application 222 may be an audio recorder software for recording audio data that may be provided by a user talking in to the microphone 106 on the USB headset 100.

Operating system 224 may include software having programming instructions such as, for example, an Android Operating system with a Linux kernel or a Windows Operating system with a Windows NT kernel. The operating system 224 also includes a device driver 226 configured to control hardware devices that may be connected externally to the host device 200. For example, a peripheral device such as the USB headset 100 may be connected to the host device 200 via the USB port 202, and the device driver 226 may communicate with the USB headset 100 by executing an enumeration process 228 to configure the USB headset 100 with the host device 200. According to one aspect of the disclosure, the host system components 212 are configured to detect a peripheral device, select an available configuration, detect an application and/or application configuration and select how much to space the data apart in view of the application requirements and power saving goals.

The communications interface 218 facilitates communication between the host device 200 and other external devices. For example, the communications interface 218 may enable Wi-Fi (e.g., 802.11) or Bluetooth connections between the host device 200 and one or more local devices, such as a laptop computer or a tablet device, or a wireless router providing network access to a remote server, such as through the network. In various embodiments, the communications interface 218 may include other wired and wireless communications components facilitating direct or indirect communications between the audio processing device 200 and one or more other devices.

Figure 3:
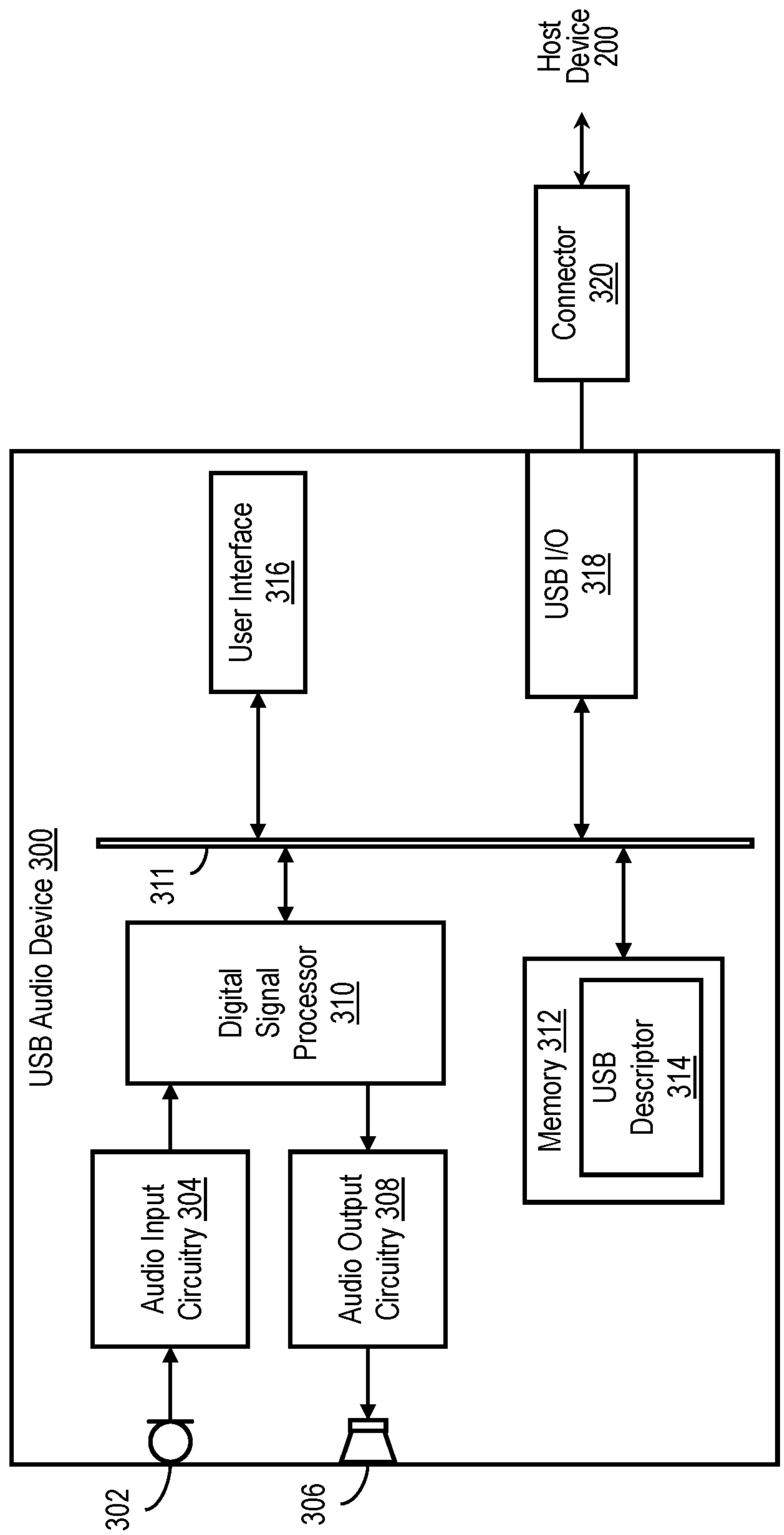
FIG. 3 is a block diagram of an example USB peripheral device, according to an embodiment of the present disclosure.

FIG. 3 illustrates an example USB audio device 300 according to an embodiment of the disclosure. The USB audio device 300 may be any electronic device having a USB input/output (USB I/O) 318 coupled to a connector 320 (e.g., a USB plug), and configured to be plugged in to a USB port 202 in the host device 200 such as the one illustrated in FIG. 2. According to one example embodiment, the USB audio device 300 may be the USB headset 100 illustrated in FIG. 1 of the present disclosure. The USB audio device 300 may include a digital signal processor (DSP) 310 for receiving a digital audio signal from the host device 200 via the USB connector 320, the USB I/O 318, and a bus 311, and processing the received digital audio signal for output. Audio output circuitry 308 is provided to convert the processed digital audio signal to an analog signal for output through the speaker 306 as an audible sound (e.g., music or tone). The USB audio device 300 may also include at least one microphone 302 configured to sense sound from the environment (e.g., a user's voice) and transmit to the host device 200 via the audio input circuitry 304 and the DSP 310. In some embodiments, the USB audio device 300 includes a user interface 316, which may include one or more buttons, touchpad display, and/or other input/output components configured to enable a user to execute commands, such as start/stop audio playback or change the audio volume.

According to an embodiment of the disclosure, the USB audio device 300 may also include a USB descriptor 314 stored in a memory 312. The USB descriptor 314 includes attributes corresponding to the USB audio device 300 that inform the host device 200 during an enumeration process, when connected. The USB descriptor 314 includes at least a device descriptor, configuration descriptor, interface descriptor, and endpoint descriptor, as laid out, for example, in the USB 2.0 specification.

Figure 4:
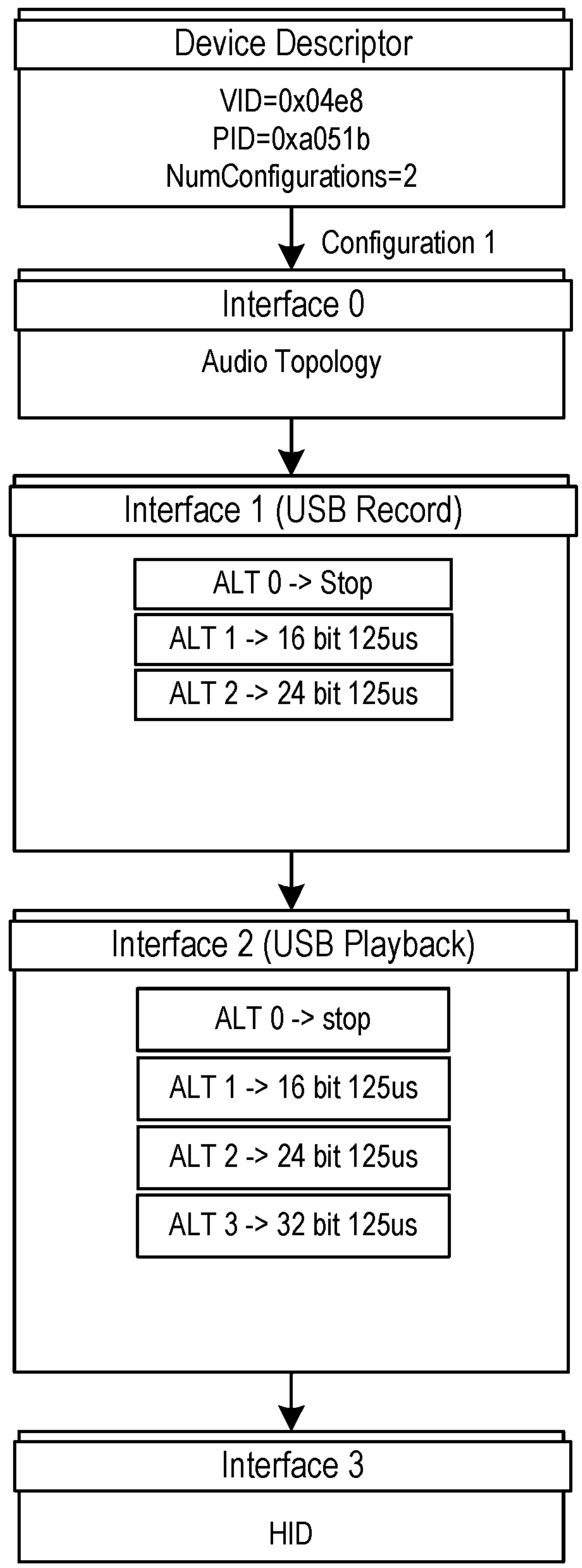
FIG. 4 is an example of a USB device descriptor that includes one configuration descriptor and one burst interval.

In some existing USB headsets, the USB device descriptor includes just one configuration descriptor as shown in FIG. 4. Accordingly, the device descriptor for such USB headset includes the line "NumConfigurations=1" which indicates that this USB headset has just one configuration descriptor, including interface descriptors 0-3. Thus, when the USB headset is plugged in to a host device (e.g., smartphone having an audio player/recorder), an enumeration process begins and the one configuration descriptor is loaded from the USB headset to the host device. When the host device receives the one configuration descriptor, the host device processes the information contained in the configuration descriptor and sets the host device accordingly to execute applications. In this example device descriptor, interface descriptor 1 for recording and interface descriptor 2 for playback include interfaces for the audio data burst at regular intervals of 125 us only. In other words, when this USB headset is plugged in to a host device, the host device may select the bit rate (e.g., 16 bits, 24 bits, 32 bits) but the bursting interval will always occur every 125 us. Coincidentally, most host devices automatically select by default, the highest bit rate. Additionally, because this device descriptor includes only one configuration descriptor, the host device will always use this configuration descriptor.

Figure 5:
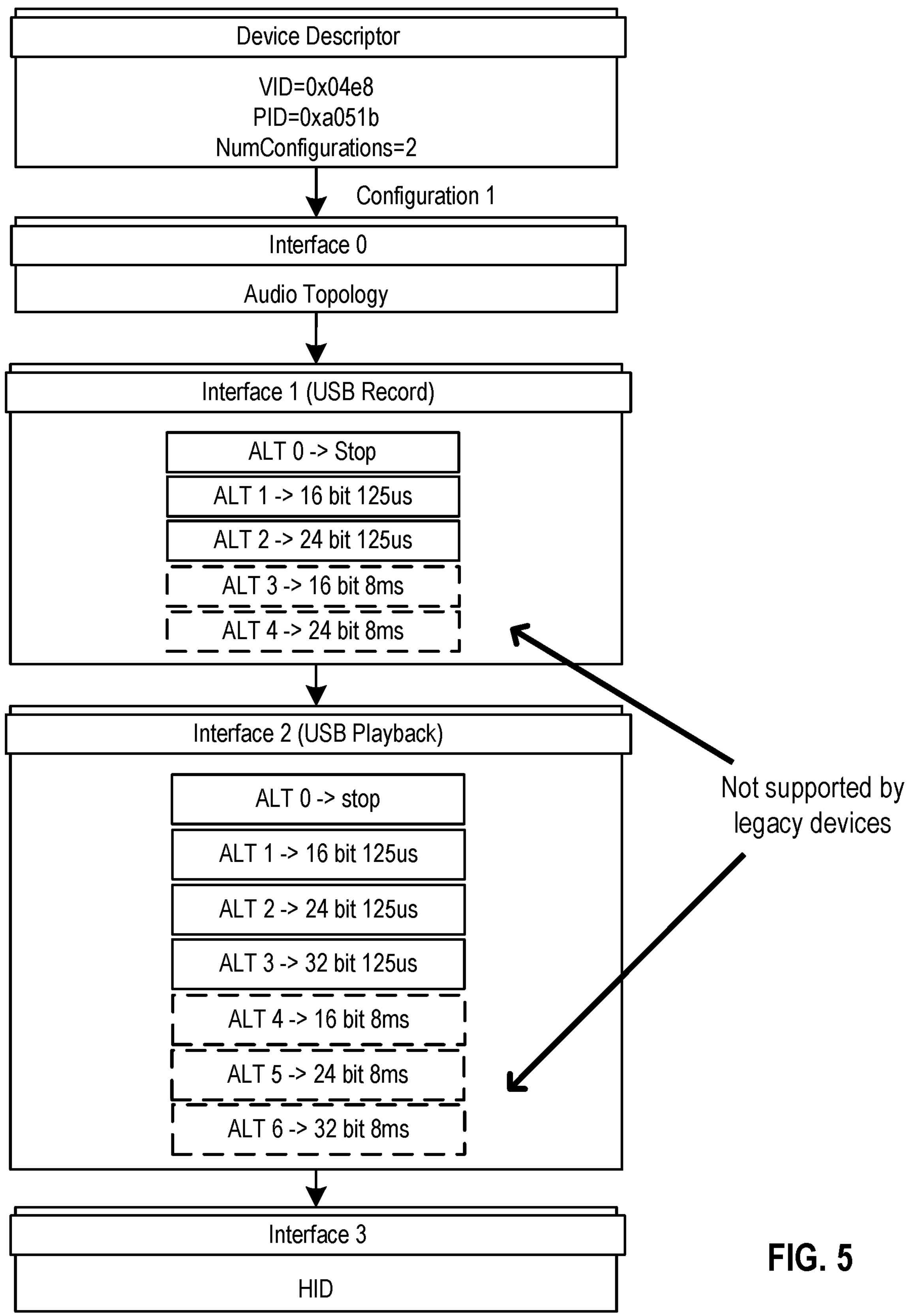
FIG. 5 is an example of an improved USB device descriptor that includes a plurality of burst intervals in configuration descriptor, according to an embodiment of the present disclosure.

FIG. 5 illustrates an example USB device descriptor for one configuration descriptor that includes interface descriptors 1 and 2 having additional attributes for longer intervals, e.g., 125 us and 8 ms. In this embodiment, the host device is configured to dynamically select from two different interval lengths, 125 us or 8 ms. When the 8 ms interval is selected, 125 us bursts of audio data will be transmitted every 8 ms. Thus, the USB bus will be active with data for 125 us and then idle for 7,875 us. During this idle period, the USB bus may be put in to an L1 sleep state, taking advantage of the LPM features and conserving power of the host device. The host device is also configured to select and support an interface descriptor having different intervals allowing the host device to take advantage of LPM through dynamic switching. If this configuration descriptor is loaded on to a legacy host device (e.g., a legacy smartphone) that has a kernel that is not configured to support selecting from multiple intervals, then the host device may be unable to properly playback or record the audio in this configuration because the host device will expect a 125 us interval while the USB device expects an 8 ms interval. For example, the audio may skip or no sound may be heard through the headset. In some embodiments, the host device is configured to dynamically select from a plurality of burst intervals, which allows the host device to be able to switch among different burst intervals, thus take advantage of LPM power conserving features, while still transmitting quality audio.

Figure 6:
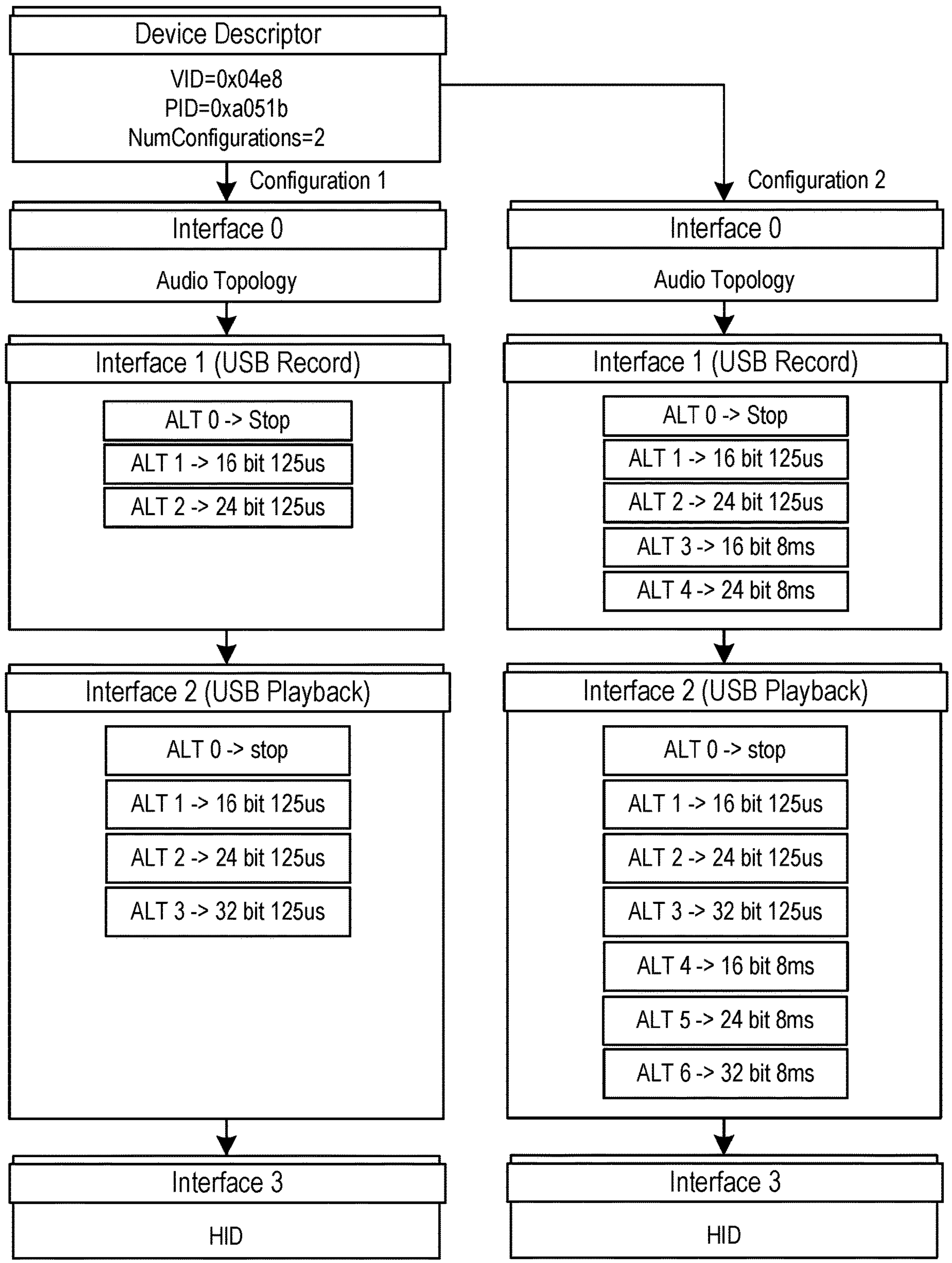
FIG. 6 is an example of an improved USB device descriptor that includes two configuration descriptors and a plurality of burst intervals, according to an embodiment of the present disclosure.

Turning to FIG. 6, and according to various embodiments of the present disclosure, the device descriptor of the USB device (e.g., USB headset) includes two configuration descriptors and the line "NumConfigurations=2" to indicate to the host device that this USB headset has two configuration descriptors. According to the embodiment, the first configuration descriptor is similar to the configuration descriptor shown in FIG. 4 and includes interface descriptors with one burst interval (e.g., 125 us) and therefore does not include the LPM features. As such, any host device that is connected to this USB headset and loads the first configuration can properly playback or record audio without using the LPM features. Thus, although the power saving features of LPM cannot be taken advantage here, the audio may be played back or recorded properly without skipping. The second configuration descriptor is similar to the configuration descriptor shown in FIG. 5 and includes interface descriptors that may include the LPM features if the longer burst intervals are selected. Thus, a host device that is connected to this USB headset and loads the second configuration descriptor will be able to playback or record the audio using LPM features if the host device is capable of supporting LPM.

Accordingly, a USB device having a USB device descriptor such as the one illustrated in FIG. 6 may be connected with any host device, legacy or modern, and the user will be able to experience quality audio because the host device will be able to select from configuration descriptor 1 or 2 depending on the capabilities of the host device. Moreover, if the host device is capable of supporting dynamic selection of burst intervals, then the LPM features may be taken advantage of, and substantial power savings of the host device from audio playback and/or recording may be realized. Thus, the USB headset is backward compatible for use with either a legacy host device or a modern host device based on selecting either the first configuration descriptor or the second configuration descriptor.

In some embodiments, a host device (e.g., a modern host device) is configured to detect and select the second configuration that may include a mix of bit rates and burst intervals to allow the host to select a burst interval (thus utilizing the LPM features) to match the user application that is running on host. For example, on a mobile call where the desired latency is short, a shorter interval (e.g., 250 us or 500 us) may be selected. For playback of audio (e.g., music) or other application where latency is not critical, but power savings may be desired, then a larger interval may be selected (e.g., 8 ms) in which the latency is larger and power savings is higher. Thus, the second configuration of the illustrated embodiment is configured to allow the host to dynamically select power consumption (e.g., by selecting burst rates) and audio quality (e.g., by selecting bit rates) based on the application that is running. In some embodiments, the operating system, the application and/or the user may select the interval.

In some embodiments, a legacy host device that is not compatible with the second configuration is configured to detect and select the first configuration. For example, the second configuration includes selectable burst rates but the legacy host device is not compatible with such selectable burst rates. Thus, the first configuration includes a burst rate that is compatible with the legacy host device (e.g., a burst rate fixed at 125 us) and selectable bit rates.

Advantages of the present application should be apparent to persons having ordinary skill in the art. Many peripherals may include a configuration for an interconnection standard, including backward compatibility with older standards.

However, the legacy systems are not always capable of taking advantage of improvements in the standard. A modern peripheral device may be operational, for example, when it is connected to a legacy system by selecting a single interval for operation. In the present disclosure, a first configuration is selected that provides compatibility with the legacy host device while enabling dynamic switching for of bit rates for improved audio quality instead of having to select from a configuration that the legacy host device is unable to support, for example, different burst rates. For example, in applications that include echo cancellation, a longer selected delay (e.g., a longer latency) may require more echo memory in order to effectively cancel or suppress unwanted echo. Thus, the host device may be configured to detect an application that includes acoustic echo cancellation and/or detect an operable delay used by the acoustic echo canceller (e.g., 2-4 ms) and select a configuration that is compatible with the acoustic echo canceller (e.g., an interval that is less than or approximately equal to the delay of the echo canceller).

In some embodiments, the peripheral device includes the second configuration identifying available bit rate and burst interval mixes to the host device (e.g., modern host device), which then uses dynamic interval selection to optimize the configuration based on the identified mixes. The mixture of different bit rates (e.g., 16 bit, 24 bit, 32 bit) and burst intervals (e.g., 8 ms, 125 ms) are identified and dynamically selected based on host configuration, application, user preferences and/or other criteria.

Figure 7:
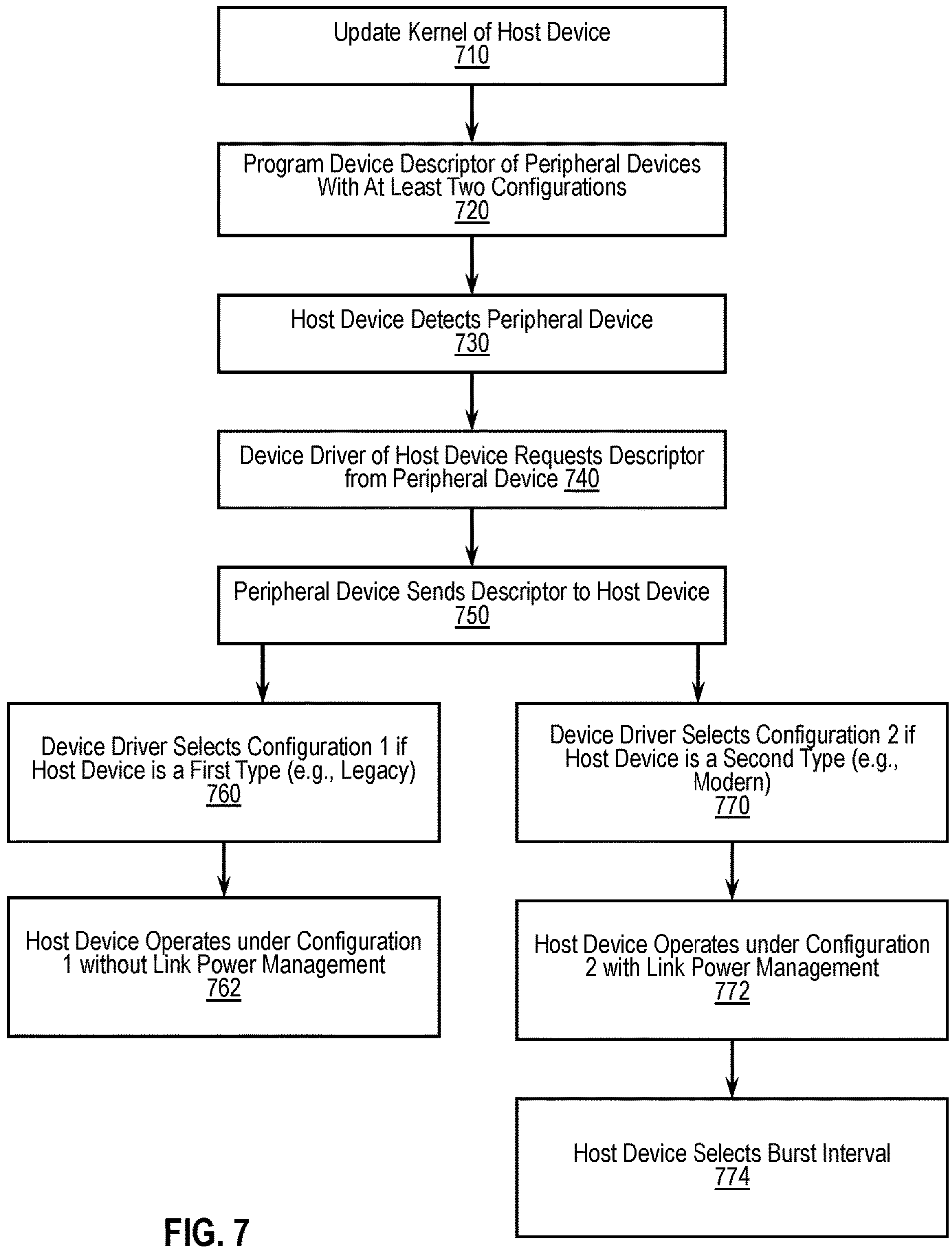
FIG. 7 is a flow chart illustrating an example process for providing backwards compatibility of USB electronic devices, according to an embodiment of the present disclosure.

FIG. 7 is a flow chart illustrating an example technique for backward compatibility of electronic devices, according to an embodiment of the present disclosure. In some embodiments, a kernel of the host device may be updated 710 such that the host device looks for at least two configuration descriptors during enumeration and then selects the appropriate configuration descriptor based on the host device hardware or the software version of the operating system. For example, a host device that is not capable of supporting LPM features will select the first configuration descriptor, whereas a host device that is capable of supporting LPM features will select the second configuration descriptor of the USB audio device. In some embodiments, the host device may iterate the available configuration descriptors to select the highest configuration while "bInterfaceClass=1" in the default interface descriptor.

According to the various embodiments of the present disclosure, the USB descriptor of the USB audio device may be programmed with two sets of configuration descriptors 720. As shown in FIG. 6, the first configuration descriptor includes interface descriptors that do not support dynamic switching and therefore use LPM features, and the second configuration descriptor includes interface descriptors that support dynamic switching and therefore use the LPM features. While only two sets of configuration descriptors are shown in FIG. 6, additional configuration descriptors may be envisaged to provide additional options and features for the host device and the USB audio device.

In some embodiments, when the USB audio device is connected to the host device via a USB connector, the host device detects that a peripheral device (e.g., USB audio device) is connected 730 to the host device, and the enumeration process is executed. The device driver of the host device sends a request via the USB connection to the USB audio device to send the device descriptor 740. In response to this request, the USB audio device sends the device descriptor to the host device 750. According to various embodiments of the present disclosure, the host device receives the device descriptor and verifies that "bmAttributes.LPM=1" in the Binary device Object Store (BOS) USB 2.0 extension device capability descriptor. Then, the host device may identify that this USB audio device includes two configuration descriptors based on the "NumConfiguration=2." The host device may iterate each of the available configurations until the desired configuration is selected. For example, for each configuration, the host device may verify that "bInterfaceClass=1" in the default interface descriptor of the configuration to verify that this is a USB audio device. Then, the host device may scan the endpoint descriptors associated with each of the configurations. If the USB device is a high-speed USB device, and the "bInterval" value is greater than or equal to 5 (e.g., greater than or equal to 2 ms), then this configuration is selected and the iteration of the available configuration ends. If the USB device is a full-speed USB device, and the "bInterval" value is greater than or equal to 2 (e.g., greater than or equal to 2 ms), then this configuration is selected and the iteration of the available configuration ends. If these conditions are not met, then the iteration of the available configurations continue.

Accordingly, the host device selects either the first configuration descriptor or the second configuration descriptor based on whether the host device is capable of supporting LPM. If the host device is incapable of supporting LPM features, for example, because the host device is a legacy smartphone device, then the first configuration descriptor is selected 760. The host device and the USB audio device are now configured to operate without LPM, and a user may open an application (e.g., a music player) on the host device and begin playing music 762. Although power consumption cannot be reduced using LPM in this configuration, the USB audio device will still be able to operate properly, for example, such that the audio playback is clear and audible without skipping. On the other hand, if the host device is capable of supporting LPM features, for example, because the host device is a modern smartphone, then the host device selects the second configuration descriptor that includes interface descriptors supporting LPM 770. In this case, the host device and the USB audio device is now configured to operate in a configuration that supports dynamic switching and therefore may use LPM features 772. Accordingly, the software application or the operating system of host device may select the desired burst interval for the intended application 774. By selecting a shorter interval, e.g., 250 us or 1 ms, power saving may be minimal, but latency is also minimal. On the other hand, by selecting a longer interval, e.g., 4 ms or 8 ms, power savings may be more significant, but the latency will be greater and therefore may not be suitable for applications such as two-way phone or audio conversations. Accordingly, the described techniques provide methods and system for operability of a USB audio device with a variety of host devices, without having to worry whether the host device is old or new, or whether the host device supports LPM. Further, if the host device support LPM, then the host device may dynamically switch between different burst intervals to vary the amount of power savings that is possible through LPM.

In some embodiments, an audio session is established through an application on the host device that includes a quality of service descriptor for the session. Based on the quality of service defined for the audio session, the host is configured to select a sample rate, data format, and interval/latency. Using the dynamic switching techniques of the present disclosure, a host device (e.g., including legacy host devices) may operate with improved audio quality while experiencing a reduction in power consumption.

The terminology used herein is for the purpose of describing particular embodiments and is not intended to be limiting of the present disclosure. It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and/or hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

The embodiments described herein are examples only and the present disclosure should not be construed as being limited to only the embodiments illustrated herein. Rather, these example embodiments are presented to convey aspects and features of the present disclosure to those skilled in the art. Accordingly, processes, elements, and techniques that are not necessary to those having ordinary skill in the art for a complete understanding of the aspects and features of the present disclosure may not be described. One skilled in the art may recognize various alternative embodiments from those specifically disclosed. Those alternative embodiments are also intended to be within the scope of this disclosure. As such, the embodiments are limited only by the following claims and their equivalents.

The invention claimed is:

1. A system, comprising:

a logic device configured to cause the system to perform operations comprising:

requesting, from a peripheral device coupled to a host device, a device descriptor of the peripheral device;

receiving, from the peripheral device, the device descriptor comprising at least two configurations, a first configuration comprising an audio communications protocol including a plurality of selectable audio bit-rates and a second configuration comprising a plurality of selectable audio bit-rates and burst-rates; and selecting, from the first configuration and the second configuration based, at least in part, on a configuration of the host device, wherein the host device is configured to select the second configuration when the host device is compatible with the second configuration and select the first configuration when the host device is not compatible with the second configuration.

2. The system of claim 1, wherein the logic device is further configured to cause the system to perform operations comprising:

selecting the second configuration in response to the host device being a second type compatible with the second configuration; and selecting the first configuration in response to the host device being a legacy device that is not operable to with the second configuration.

3. The system of claim 2, wherein the second configuration comprises operating the host device using a power management scheme configurable to facilitate audio communications with reduced power consumption.

4. The system of claim 2, wherein the second configuration comprises operating the host device by dynamically selecting a mix of the selectable audio bit-rates and burst rates based, at least in part, on a configuration of an audio application running on the host device.

5. The system of claim 1, wherein the second configuration comprises an interface descriptor comprising a plurality of burst intervals configured to be selected by the host device.

6. The system of claim 5, wherein in response to selecting the second configuration, the operation further comprises selecting, a burst interval from among the plurality of burst intervals based on an application operating on the host device.

7. The system of claim 6, wherein in response to the selecting the burst interval, power consumption rate by the host device is reduced.

8. The system of claim 1, wherein the host device is a digital audio player and the peripheral device is a USB headset.

9. The system of claim 1, further comprising an echo canceller;

wherein the logic device is further configured to:

detect an audio application using the echo canceller; and dynamically select an available bit-rate and burst rate based, at least in part, on a configuration of the audio application and a configuration of the echo canceller.

10. The system of claim 1, wherein the host device comprises:

a USB port configured to receive a USB plug from the peripheral device; and an audio signal processor configured to process and transmit a digital audio signal from a non-transitory memory to the USB port.

11. An enumeration method by a host device, comprising:

requesting, from a peripheral device coupled to the host device, a device descriptor comprising at least two configurations, a first configuration comprising an audio communications protocol including a plurality of selectable audio bit-rates and a second configuration comprising a plurality of selectable audio bit-rates and burst-rates;

receiving, from the peripheral device, the device descriptor comprising at the least two configurations; and selecting, from the first configuration and the second configuration based, at least in part, on a configuration of the host device, wherein the host device is configured to select the second configuration when the host device is compatible with the second configuration and select the first configuration when the host device is not compatible with the second configuration.

12. The method of claim 11, further comprising:

selecting the second configuration in response to the host device being a second type compatible with the second configuration; and selecting the first configuration in response to the host device being a legacy device that is not operable to with the second configuration.

13. The method of claim 12, wherein the second configuration comprises operating the host device using a power management scheme configurable to facilitate audio communications with reduced power consumption.

14. The method of claim 12, wherein the second configuration comprises operating the host device by dynamically selecting a mix of the selectable audio bit-rates and burst rates based, at least in part, on a configuration of an audio application running on the host device.

15. The method of claim 11, wherein the second configuration comprises an interface descriptor comprising a plurality of burst intervals configured to be selected by the host device.

16. The method of claim 15, further comprising, in response to selecting the second configuration, selecting, a burst interval from among the plurality of burst intervals based on an application operating on the host device.

17. The method of claim 16, wherein in response to the selecting the burst interval, power consumption rate by the host device is reduced.

18. The method of claim 11, wherein the host device is a digital audio player and the peripheral device is a USB headset.

19. The method of claim 11, further comprising detecting an audio application operating on the host device with echo cancellation; and dynamically selecting the available bit-rate and burst rate based, at least in part, on a configuration of the audio application and a configuration of the echo cancellation.

20. The method of claim 11, wherein the host device comprises:

a USB port configured to receive a USB plug from the peripheral device; and an audio signal processor configured to process and transmit a digital audio signal from a memory to the USB port.

* * * * *